(12) United States Patent
Halstead et al.

(10) Patent No.: US 8,122,209 B1
(45) Date of Patent: Feb. 21, 2012

(54) DISKLESS STORAGE DEVICE

(75) Inventors: Mark Halstead, Holliston, MA (US);
Marik Marshak, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 699 days.

(21) Appl. No.: 12/079,436

(22) Filed: Mar. 27, 2008

(51) Int. Cl.
*G06F 13/00* (2006.01)
(52) U.S. Cl. ......................... 711/161; 711/162
(58) Field of Classification Search ......................... None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,553,464 B1 | 4/2003 | Kamvysselis et al. | |
| 6,697,367 B1 | 2/2004 | Halstead et al. | |
| 6,732,194 B1 | 5/2004 | Kopylovitz et al. | |
| 6,976,139 B2 | 12/2005 | Halstead et al. | |
| 7,054,883 B2 | 5/2006 | Meiri et al. | |
| 7,088,703 B2 | 8/2006 | O'Hare et al. | |
| 2003/0028590 A1* | 2/2003 | Gonzalez et al. | 709/203 |
| 2006/0069887 A1 | 3/2006 | LeCrone et al. | |
| 2006/0069890 A1 | 3/2006 | Cox et al. | |

OTHER PUBLICATIONS

U.S. Appl. No. 12/079,546, filed Mar. 27, 2008, Halstead et al.
U.S. Appl. No. 12/079,476, filed Mar. 27, 2008, Halstead et al.

* cited by examiner

*Primary Examiner* — Hetul Patel
(74) *Attorney, Agent, or Firm* — Muirhead and Saturnelli, LLC

(57) ABSTRACT

A diskless storage device includes a volatile memory and at least one director, coupled to the volatile memory, that receives data for the diskless storage device and provides the data to the volatile memory. The at least one director provides logical storage device functionality without using non-volatile memory. The logical storage device functionality may include addressing tracks, blocks, and cylinders of logical storage devices of the diskless storage device. The volatile memory may include a plurality of slots and where data is stored in the slots. Data may be stored in unused ones of the slots and/or slots marked for reuse.

14 Claims, 13 Drawing Sheets

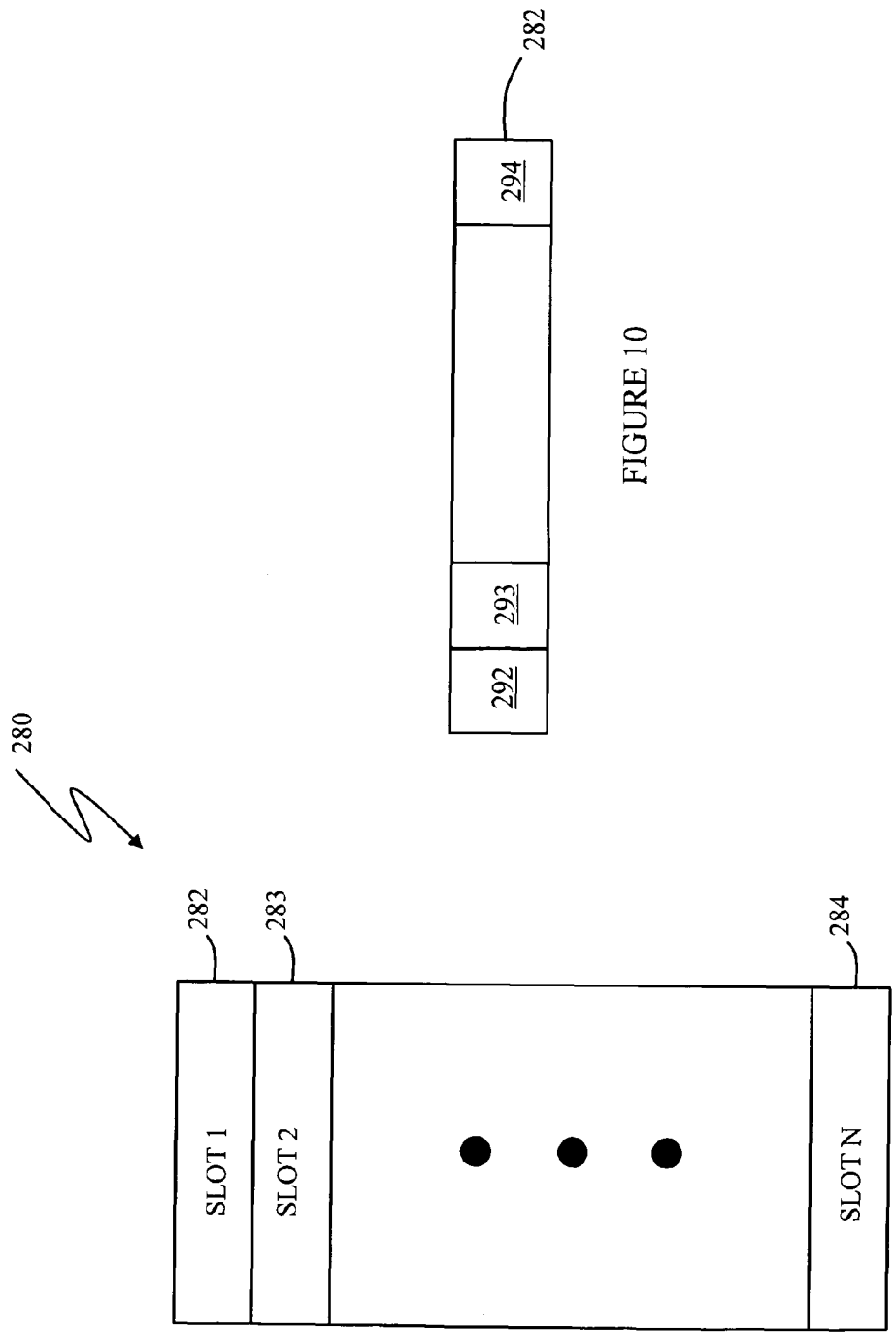

DISKLESS STORAGE DEVICE

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

Although RDF provides an effective two-site solution, there are instances where the same or similar functionality is desired for more than two sites. One way this has been addressed is described in U.S. Patent Application No. 20060069887 titled "TRIANGULAR ASYNCHRONOUS REPLICATION", which is incorporated by reference herewith, that describes a system having a single local site and two separate remote sites. However, it is desirable to provide other data replication configurations as well as devices and systems that support such alternative configurations and possibly have other uses as well.

SUMMARY OF THE INVENTION

According further to the system described herein, computer software, provided in a computer-readable medium, handles processing for an intermediate RDF site coupled to other RDF sites. The software includes executable code that stores RDF data received from a first other RDF site in a memory of the intermediate RDF site and executable code that transmits the RDF data to a second other RDF site different from the first other RDF site. The first other RDF site may be a local RDF site. The second other RDF site may be a remote RDF site. The memory may be a volatile memory that includes a plurality of slots. The computer software may also include executable code that marks a particular one of the slots for reuse in response to data therefor being successfully transmitted to the second other RDF site. The intermediate RDF site may have a first type of RDF relationship with the first other RDF site and a second type of RDF relationship with the second other RDF site, where the first type of RDF relationship may be different from the second type of RDF relationship. The first type of RDF relationship may be a synchronous RDF relationship and the second type of RDF relationship may be an asynchronous RDF relationship. The computer software may also include executable code that receives an acknowledge indicator from the second other RDF site and, in response thereto, relays the acknowledge indicator back to the first other RDF site.

According to the system described herein, a diskless storage device includes a volatile memory and at least one director, coupled to the volatile memory, that receives data for the diskless storage device and provides the data to the volatile memory, where the at least one director provides logical storage device functionality without using non-volatile memory. The logical storage device functionality may include addressing tracks, blocks, and cylinders of logical storage devices of the diskless storage device. The volatile memory may include a plurality of slots and wherein data is stored in the slots. Data may be stored in at least one of: unused ones of the slots and slots marked for reuse. Slots may be marked for reuse in response to data therefrom being transmitted by the diskless storage device. Data in slots may be transmitted to at least one other storage device. In response to all of the slots being used when new data is written, the diskless storage device may wait for a slot to be freed. Following writing data to the volatile memory, an acknowledgement may be provided to a source of the data.

According further to the system described herein, computer software, provided in a computer-readable medium, includes executable code that receives data, executable code that provides the data to a volatile memory, and executable code that provides logical storage device functionality without using non-volatile memory. The logical storage device functionality may include providing functionality for addressing tracks, blocks, and cylinders of logical storage devices. The volatile memory may include a plurality of slots and wherein data is stored in the slots. The computer software may also include executable code that stores data in at least one of: unused ones of the slots and slots marked for reuse. The computer software may also include executable code that marks for reuse in response to data therefrom being transmitted. Data in slots may be transmitted to at least one storage device. The computer software may also include executable code that waits for a slot to be freed in response to all of the slots already being used when new data is written. The computer software may also include executable code that provides an acknowledgement to a source of data following writing the data to the volatile memory.

According further to the system described herein, propagating RDF data includes receiving RDF data from a source RDF site, storing the RDF data in volatile memory, and transmitting the RDF data to at least one downstream RDF site, where, in response to receiving acknowledgement that the RDF data has been received by the at least one downstream RDF site, the portion of the volatile memory that contains the RDF data is marked for reuse without the RDF data being written to any non-volatile memory. The source RDF site may be a local RDF site. The at least one downstream RDF site may be a remote RDF site. At least one of the source RDF site and the at least one downstream RDF site may be an intermediate RDF site.

BRIEF DESCRIPTION OF DRAWINGS

Embodiments of the system are described with reference to the several figures of the drawings, noted as follows.

FIG. 9 is a diagram illustrating a plurality of slots for a diskless storage device according to an embodiment of the system described herein.

FIG. 10 is a diagram illustrating in more detail a slot for a diskless storage device according to an embodiment of the system described herein.

DETAILED DESCRIPTION OF VARIOUS EMBODIMENTS

Figure 1:
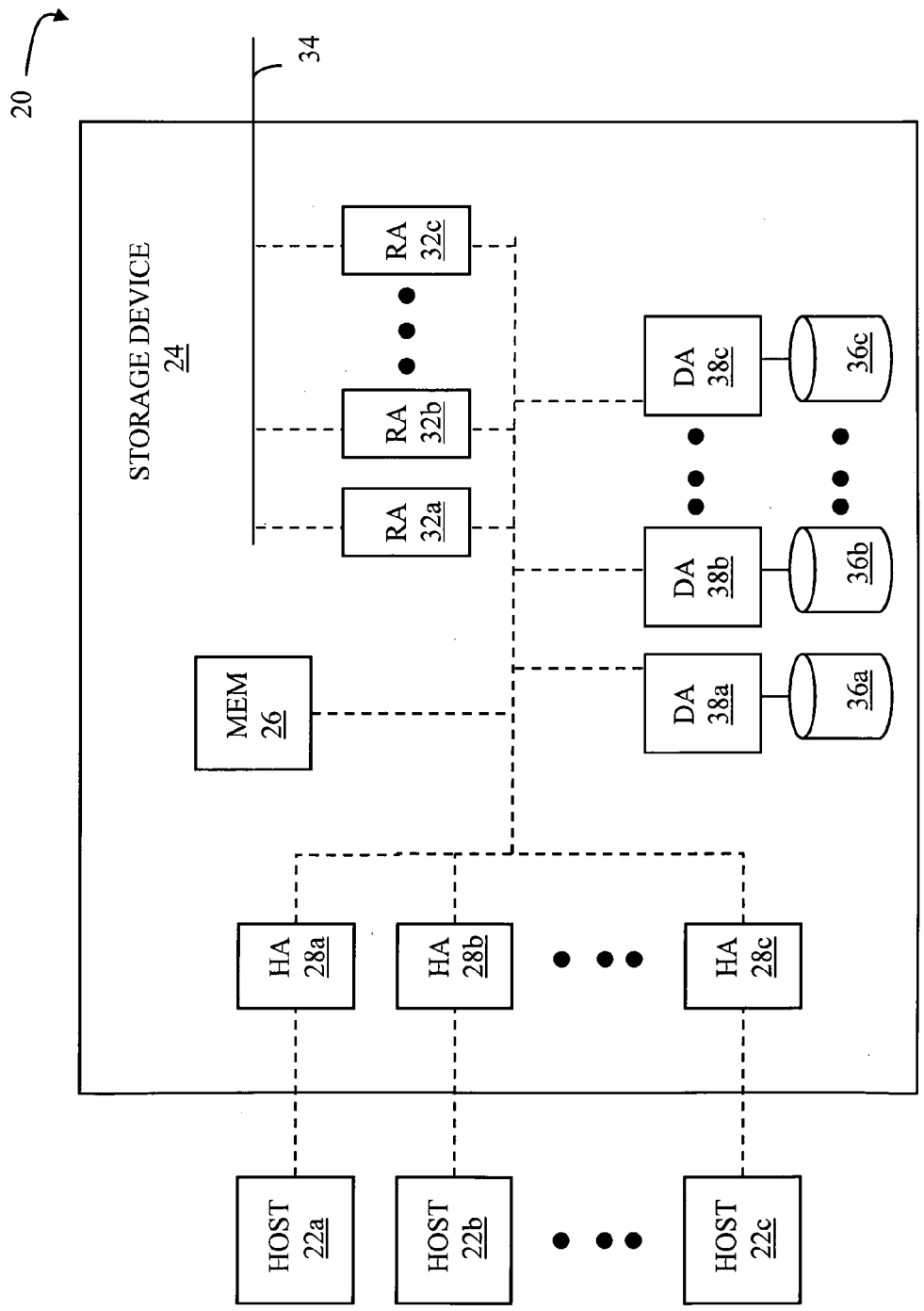
FIG. 1 is a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adapters (HA's) 28a-28c that handle reading and writing data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts and that one of the hosts 22a-22c may be coupled to more than one of the HA's 28a-28c.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disk drives 36a-36c (disk assemblies), each containing a different portion of data stored on the storage device 24. The disk drives 36a-36c should be understood as representing any appropriate type of storage media, including, without limitation, DRAM cache, flash or other solid-state storage device, tape, optical media, and/or any combination of permanent, semi-permanent and temporally-limited storage media. Each of the disk drives 36a-36c may be coupled to a corresponding one of a plurality of disk adapter units (DA) 38a-38c that provides data to a corresponding one of the disk drives 36a-36c and receives data from a corresponding one of the disk drives 36a-36c. Note that, in some embodiments, it is possible for more than one disk drive to be serviced by a DA and that it is possible for more than one DA to service a particular disk drive.

The logical storage space in the storage device 24 that corresponds to the disk drives 36a-36c may be subdivided into a plurality of volumes or logical storage devices. The logical storage devices may or may not correspond to the physical storage space of the disk drives 36a-36c. Thus, for example, the disk drive 36a may contain a plurality of logical storage devices or, alternatively, a single logical storage device could span both of the disk drives 36a, 36b. The hosts 22a-22c may be configured to access any combination of logical storage devices independent of the location of the logical storage devices on the disk drives 36a-36c. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disk drives 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
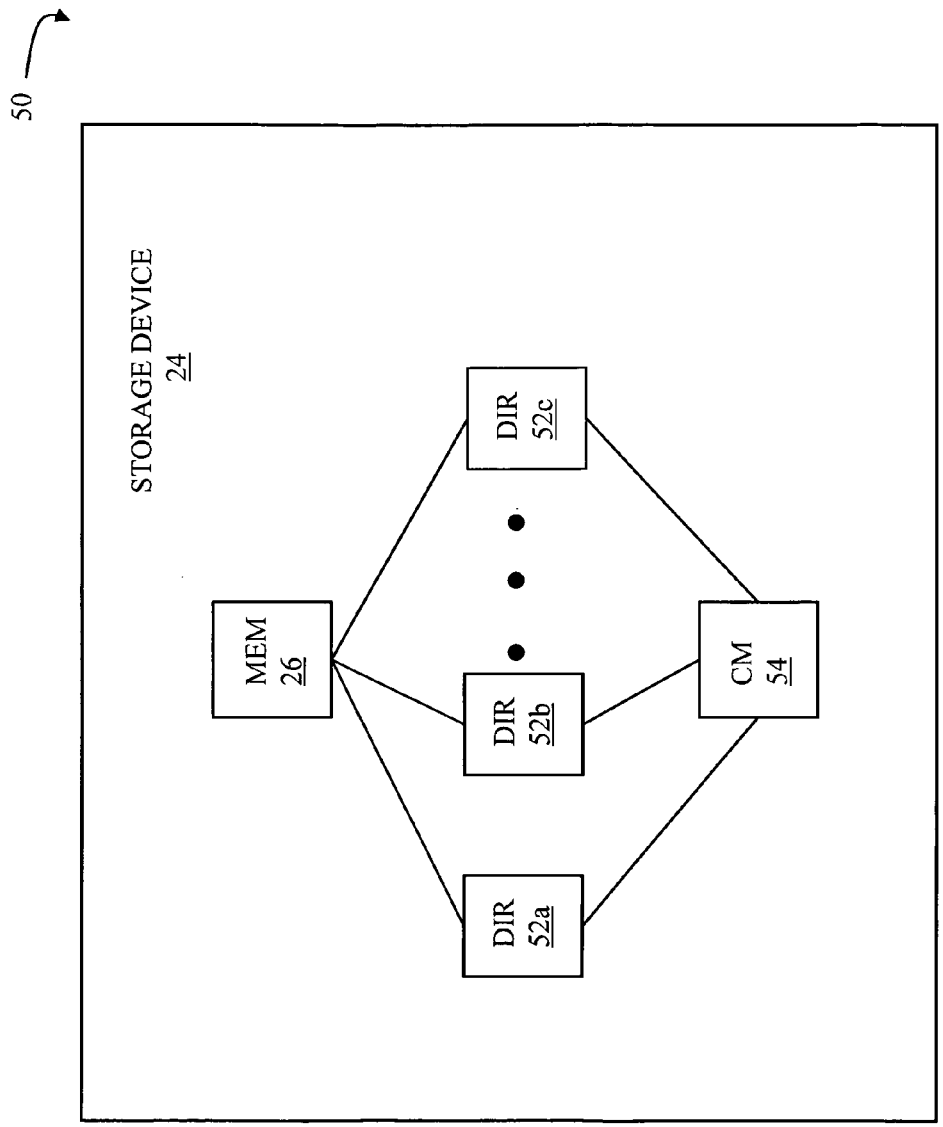
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in, some embodiments, at least one of the directors 52a-52c having multiple processor systems thereon may simultaneously perform the functions of at least one type of director and perform other processing with the other processing system. In addition, all or at least part of the global memory 26 may be provided on one or more of the directors 52a-52c and shared with other ones of the directors 52a-52c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and FIG. 2 or may be implemented using a platform that is somewhat or even completely different from any particular platform described herein.

Figure 3:
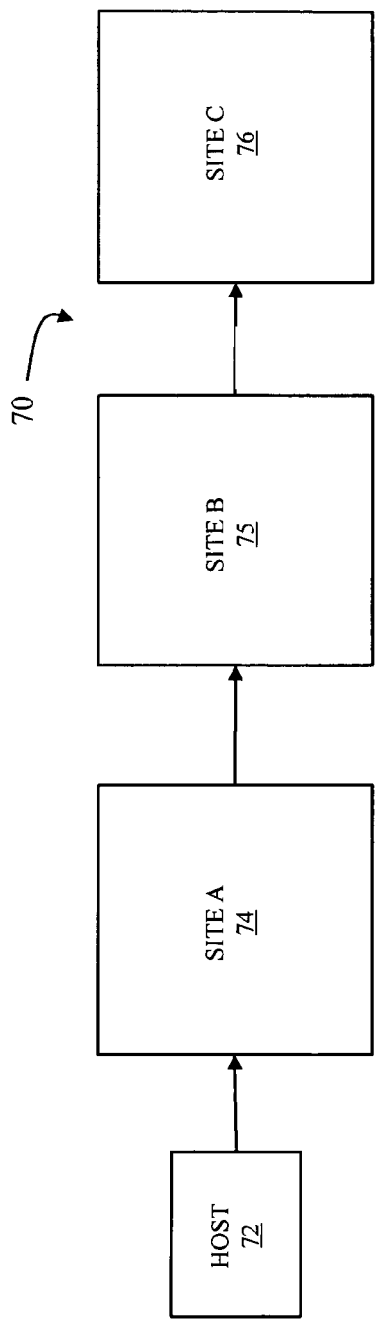
FIGS. 3-5 are diagrams illustrating various cascaded RDF configurations according to an embodiment of the system described herein.

Referring to FIG. 3, a diagram 70 shows a host 72 coupled to a plurality of storage devices 74-76. The storage device 74 may be referred to as "site A" or the local RDF site, the storage device 75 may be referred to as "site B" or the intermediate RDF site, and the storage device 76 may be referred to as "site C" or the remote RDF site. The storage devices 74-76 may be like the storage devices described herein or may be any appropriate devices capable of providing the functionality described herein.

The host 72 is coupled to the storage device 74, which has at least one logical storage device (R1) that the host 72 accesses for reading and writing data. The storage device 74 is coupled to the storage device 75. The storage device 74 includes at least one logical storage device (R21) that has an RDF relationship with the at least one logical storage device (R1) of the storage device 74 such that data written by the host 72 to the logical storage device (R1) of the storage device 74 is propagated to the logical storage device (R21) of the storage device 75 in a manner that is essentially transparent to the host 72, consistent with conventional RDF operation. The logical storage device (R1) that receives writes from the host 72 is a primary logical storage device while the logical storage device (R21) that receives copies of data written to the primary logical storage device is a secondary logical storage device.

The storage device 75 is coupled to the storage device 76, which has at least one logical storage device (R2) that has an RDF relationship with the at least one logical storage device (R21) of the storage device 75 such that data written to the logical storage device (R21) of the storage device 75 is propagated to the logical storage device (R2) of the storage device 76. Data is written to the logical storage device (R21) by virtue of being the secondary device in the R1/R21 RDF relationship between the storage devices 74, 75. Thus, the logical storage device (R21) acts as a secondary logical storage device with respect to the primary logical storage device (R1) of the storage device 74, but acts as a primary logical storage device with respect to the secondary logical storage device (R2) of the storage device 76.

In an embodiment herein, the RDF relationship between the logical storage devices R1/R21 and the RDF relationship between the logical storage devices R21/R2 may be any type of RDF relationship, including synchronous RDF, asynchronous RDF, etc. The asynchronous RDF mechanism may be like that described in U.S. Pat. No. 7,054,883, which is incorporated by reference herein. In some embodiments, the system may not provide an asynchronous RDF connection between R1 and R21 and a simultaneous asynchronous RDF connection between R21 and R2. In some embodiments, the R1/R21 RDF connection may be a synchronous RDF relationship while the R21/R2 connection may be an asynchronous RDF relationship.

Figure 4:
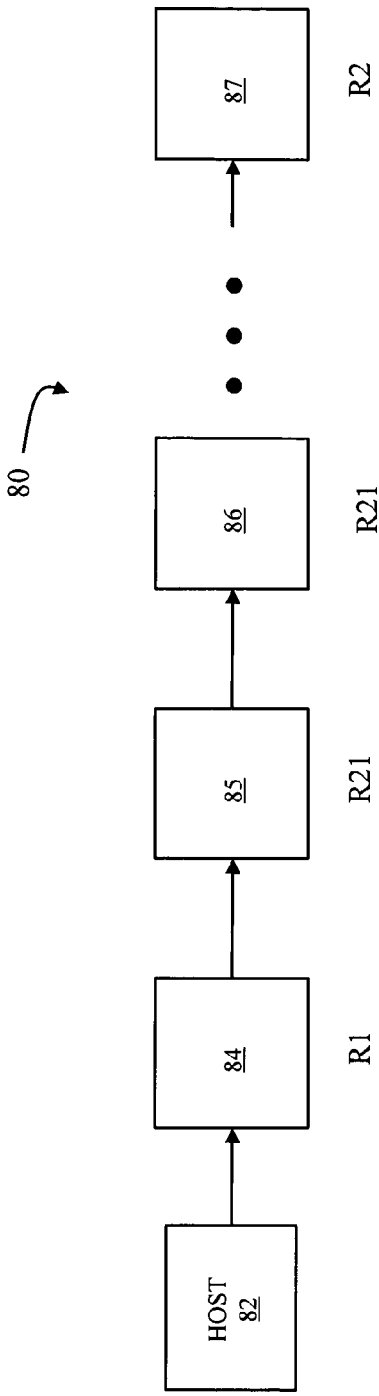

Referring to FIG. 4, a diagram 80 shows a host 82 coupled to a storage device 84 that acts as a local RDF site. The storage device 84 is coupled to another storage device 85, which is coupled to yet another storage device 86. The storage devices 85, 86 act as intermediate RDF sites. Another storage device 87 acts as a remote RDF site. A plurality of additional intermediate RDF sites (not shown) may be interposed between the storage device 86 and the storage device 87. RDF relationships exist such that data written by the host to a logical storage device (R1) of the storage device 84 is propagated through downstream logical storage devices (R21) of the storage devices 85, 86 (intermediate RDF sites) to a logical storage device (R2) of the storage device 87 that acts as a remote RDF site. Note that, generally, a local RDF site is a site couple to a host or other data source, an intermediate RDF site is a site that receives RDF data from another RDF site and propagates the data to one or more downstream RDF sites, and a remote RDF site is a site that receives RDF data but does not propagate the data to any other RDF sites.

Figure 5:
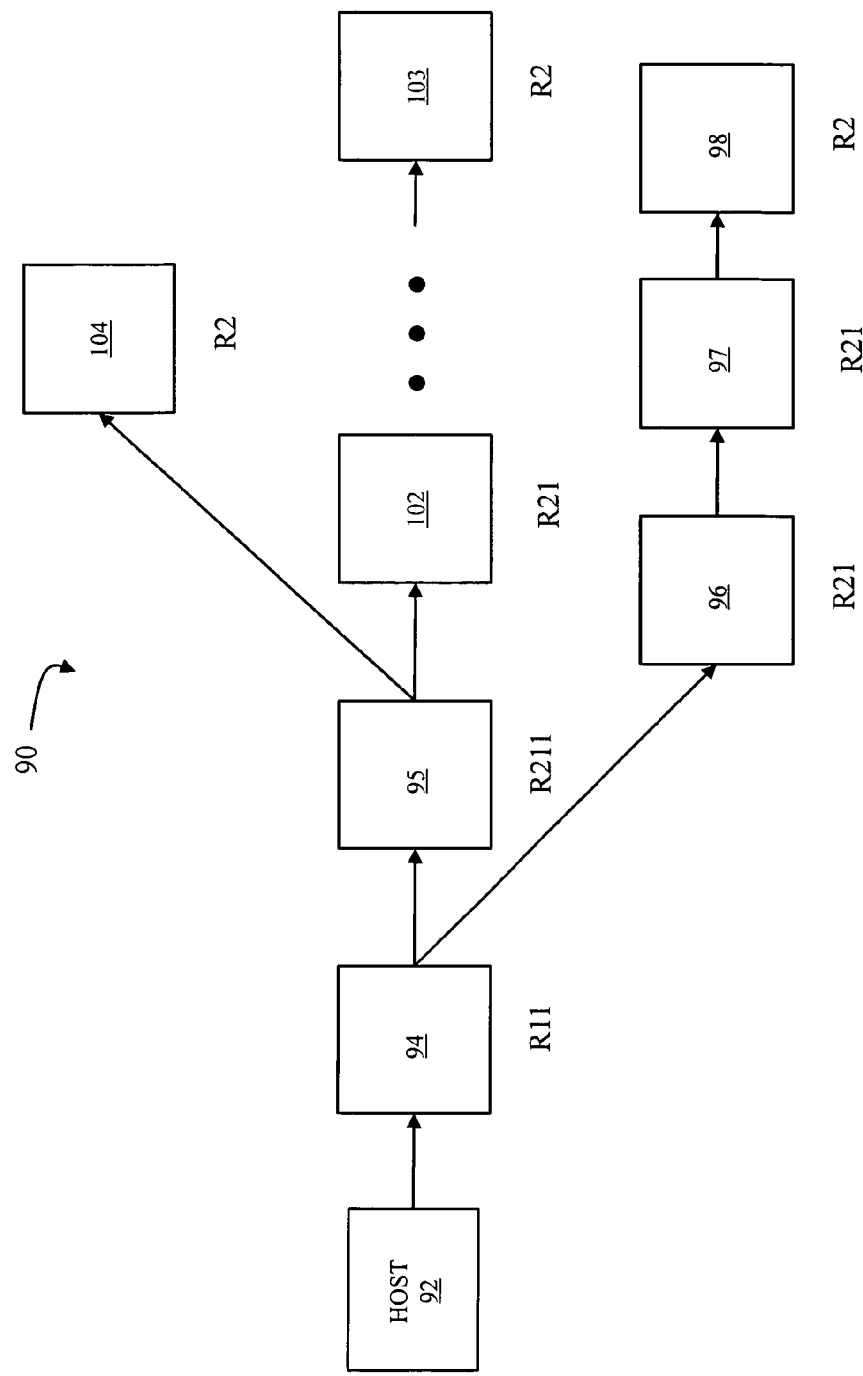

Referring to FIG. 5, a diagram 90 illustrates that there may be other configurations that are relatively more complex than those illustrated by the diagrams 70, 80, discussed above. In the diagram 90, a host 92 is coupled to a storage device 94 that has a logical storage device (R11) that acts primary logical storage device for more than one secondary logical storage device. The storage device 94 is coupled to both the storage device 95 and the storage device 96. The storage device 95 has a logical storage device (R211) that acts as an intermediate RDF site for the storage devices 102, 103, where the storage device 103 acts as a remote RDF site. The logical storage device (R211) also acts as an intermediate RDF site for the storage device 104, which acts as a remote RDF site. The storage device 96 has a logical storage device (R21) that acts as an intermediate site for the storage devices 97, 98, where the storage device 98 acts as a remote RDF site.

In an embodiment herein, local RDF sites and remote RDF sites may perform in a manner similar to conventional two site RDF configurations. That is, local RDF sites may perform like conventional primary (R1) RDF sites while remote RDF sites may perform like conventional secondary (R2) RDF sites. However, as described in more detail below, intermediate RDF sites may include functionality for managing operation that exhibits characteristics of both a primary RDF logical storage device and a secondary RDF logical storage device.

Figure 6:
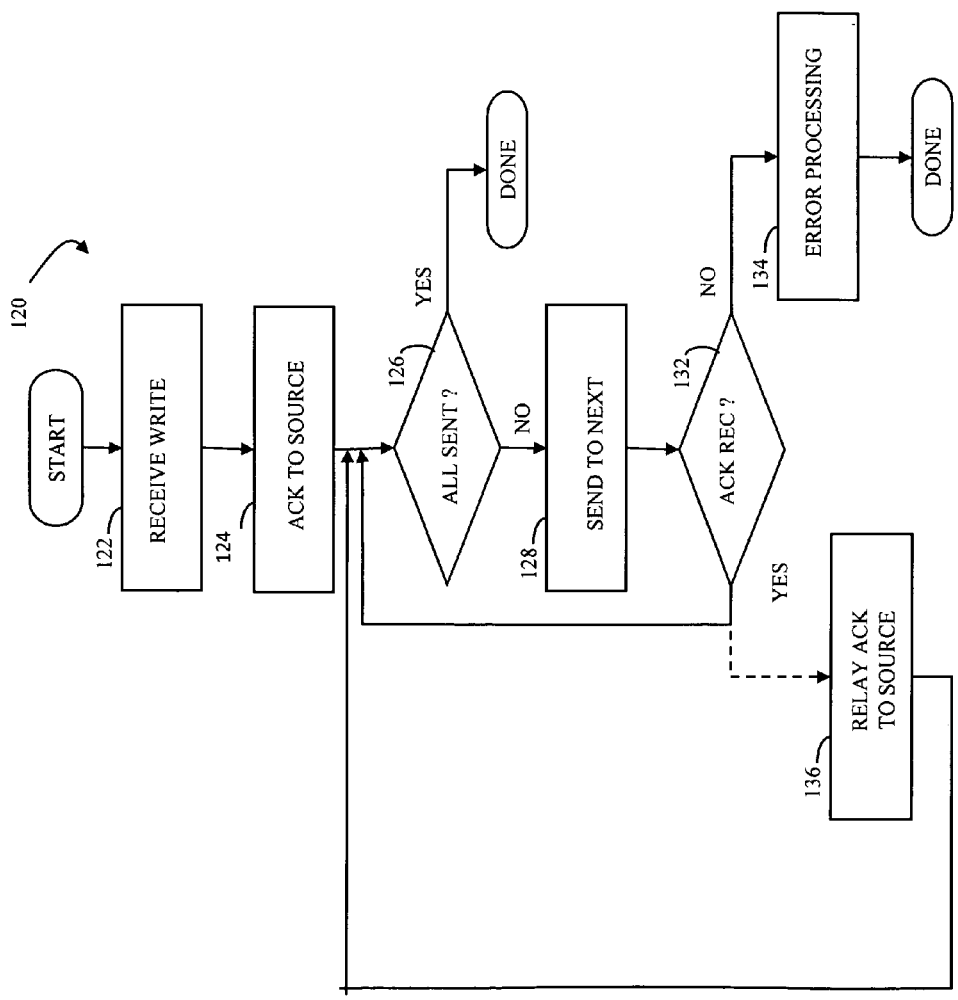
FIG. 6 is a flow chart illustrating an intermediate RDF site handling receiving and sending data in a cascaded RDF system according to an embodiment of the system described herein.

Referring to FIG. 6, a flow chart 120 illustrates processing performed in connection with an intermediate RDF site handling data transfers. Processing begins at a first step 122 where the write is received from the RDF source device, which is a logical storage device at another storage device that is either a local RDF site or an intermediate RDF site. Following the step 122 is a step 124 where receipt of the data at the step 122 is acknowledged back to the source of the data (i.e., the local RDF site or intermediate RDF site). In the case of a synchronous transfer, acknowledgement at the step 124 may be immediate. For other types of RDF transfers, processing at the step 124 may represent simply invoking whatever acknowledgement mechanism is used. For example, in instances where data is asynchronously transferred in chunks, acknowledgement at the step 124 may represent waiting to provide a single acknowledgement in response to receipt of an entire chunk. Thus, the acknowledgement may not be sent until after the all the chunks of data have sent to the downstream RDF sites.

Following the step 124 is a test step 126 where it is determined if the data received at the step 122 has been propagated to all downstream logical storage devices with which there is an RDF relationship (i.e., remote or other intermediate RDF sites). If so, then processing is complete. Otherwise, control transfers from the step 126 to a step 128, where the data is sent to a next one of the downstream logical storage devices using an appropriate RDF mechanism corresponding to the type of RDF relationship (e.g., synchronous, asynchronous, etc.) provided in connection with the downstream logical storage device.

Following the step 128 is a test step 132 where it is determined if the downstream logical storage device has appropriately acknowledged the RDF data provided thereto. If so, then control transfers from the test step 132 back to the step 126, discussed above, where it is determined if there are more downstream RDF devices to which the data needs to be propagated. Otherwise, if it is determined at the step 132 that an appropriate acknowledgement has not been received from the downstream logical storage device, then control transfers from the test step 132 to a step 134 where appropriate error processing is performed. The error processing performed at the step 134 may include providing appropriate notification that a link in an RDF relationship has failed. In other embodiments, the error processing performed at the step 134 may include retrying the data transmission a predetermined number of times before providing error notification. Following the step 134, processing is complete.

In some embodiments, one or more of the RDF sites may maintain a record of which data has been successfully propagated to different downstream RDF sites. For example, a local RDF site may maintain a record of which of the intermediate and remote RDF sites have acknowledged receipt of data that had been initially written to the local RDF site by one or more hosts coupled thereto. In an embodiment herein, the information may be maintained by an RDF site using the Symmetrix Differential Data Facility (SDDF) mechanism, which allows for a plurality sessions, each having a bitmap associated therewith bits that are set (e.g., to a logical one) whenever there is a write to a corresponding data location during a particular time period. If no write occurs to a particular location (no acknowledge received), the corresponding bit remains cleared (e.g., remains set to a logical zero). In an embodiment herein, each bit may correspond to a track of data. However, for other embodiments, it is possible to have each bit correspond to larger or smaller increments of data and it is also possible that different bits and/or different sets of bits correspond to different amounts of data. Note that it is possible to use any appropriate mechanism to track data changes, including a simulated SDDF mechanism.

In instances where one or more of the RDF sites track which other RDF sites successfully receive data, it may be useful to receive the acknowledgements from all of the downstream RDF cites. A mechanism for this is illustrated in the flow chart 120 by an alternative path from the test step 132 to a step 136, where the intermediate RDF site passes back any acknowledgement received from a downstream RDF site. Following the step 136, control transfers back to the test step 126, discussed above, for another iteration.

Figure 7:
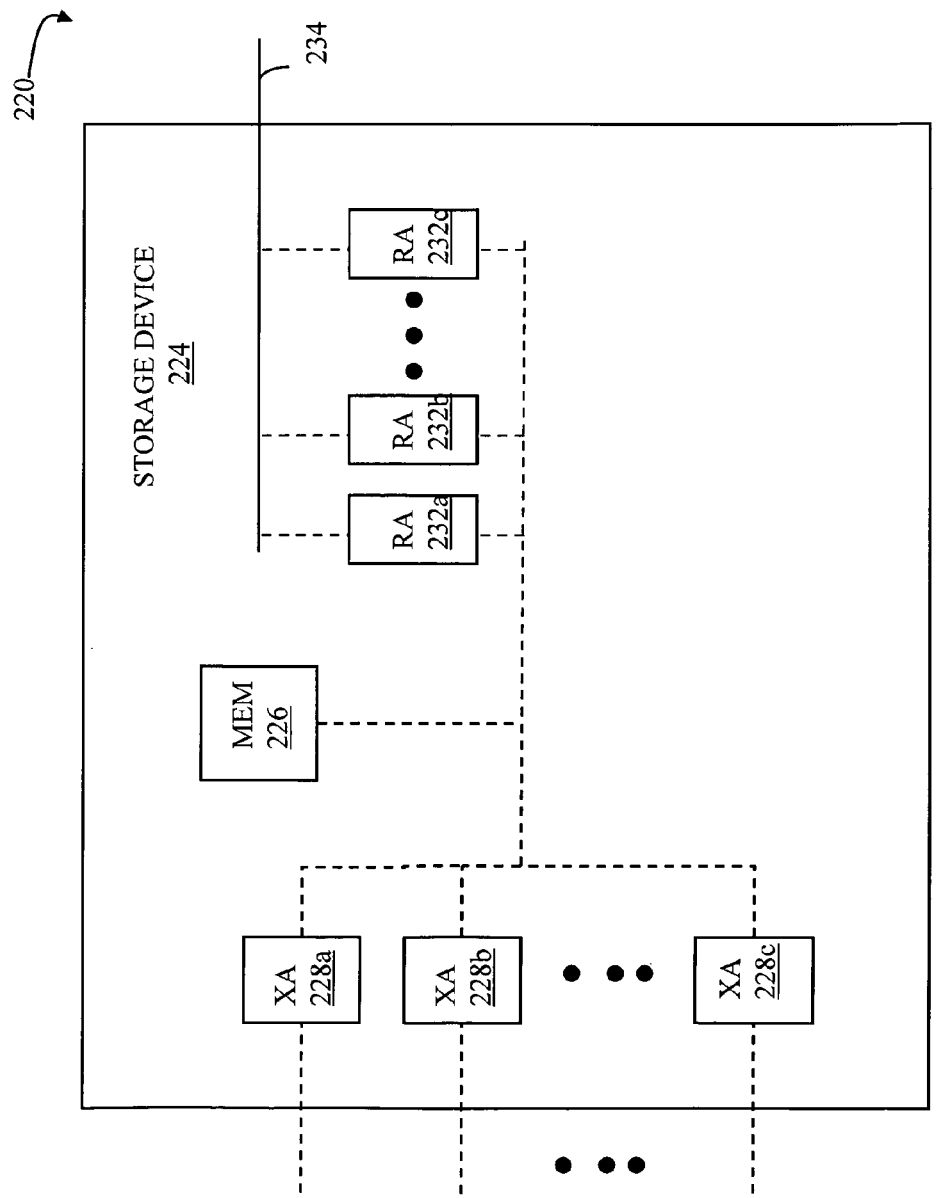
FIG. 7 is a diagram showing a diskless storage device according to an embodiment of the system described herein.

Referring to FIG. 7, a diagram 220 shows a diskless storage device 224 that is like the data storage device 24, discussed above, except that the diskless storage device 224 does not have any disk storage or other non-volatile memory used for general data storage. The diskless storage device 224 includes an internal memory 226 that facilitates operation of the diskless storage device 224 as described elsewhere herein. The diskless storage device 226 also includes a plurality of adapters (XA's) 228a-228c that handle communication with the diskless storage device 224. The XA devices may represent RA's, HA's, or some other director device. The diskless storage device 224 may include one or more RA's 232a-232c. The RA's 232a-232c are coupled to an RDF link 234. The diskless storage device 224 may be coupled to additional RDF links (not shown) in addition to the RDF link 234. Links to any of the XA's 228a-228c that are RA's may be RDF links. In some embodiments, the diskless storage device 224 may use only RA's.

One or more internal logical data path(s) exist between the XA's 228a-228c, the RA's 232a-232c, and the memory 226. In some embodiments, one or more internal busses and/or communication modules may be used. In some embodiments, the memory 226 may be used to facilitate data transferred between the XA's 228a-228c and the RA's 232a-232c. The memory 226 may contain tasks that are to be performed by one or more of the XA's 228a-228c and the RA's 232a-232c, and a cache for storing data. Use of the memory 226 is described in more detail hereinafter.

Figure 8:
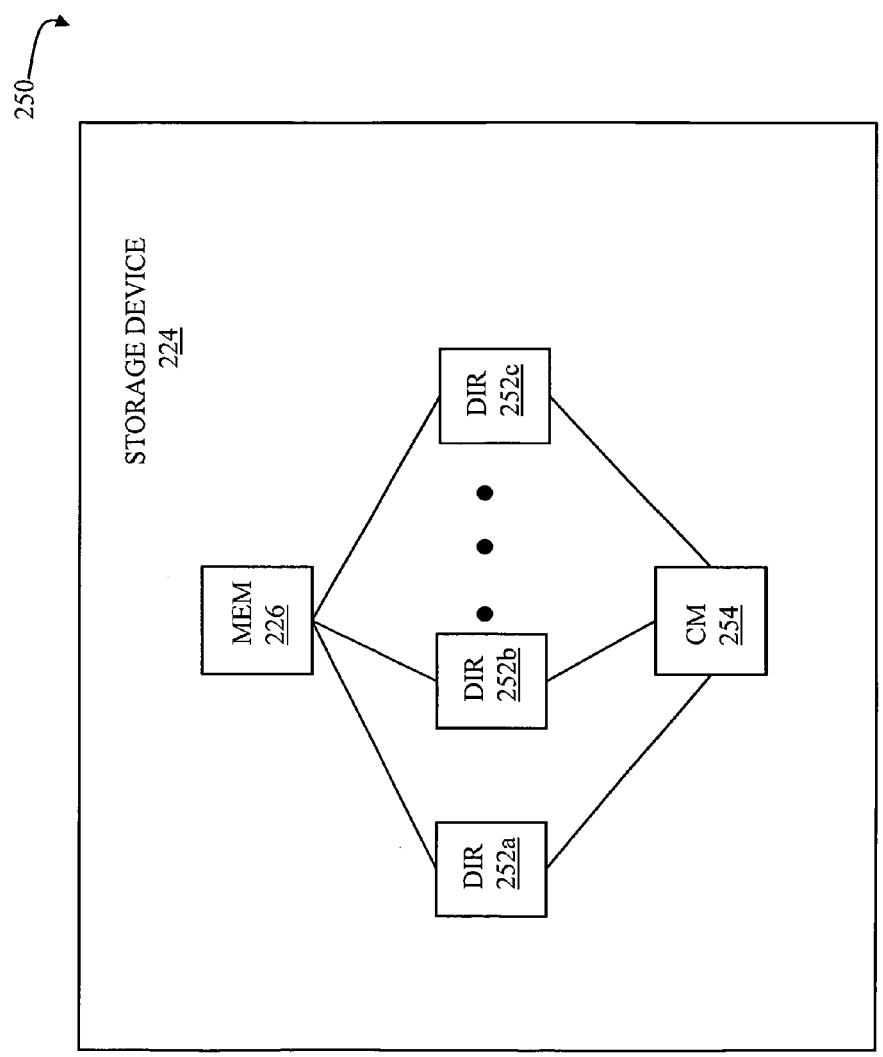
FIG. 8 is a diagram showing a storage device, memory, a plurality of directors, and a communication module that may be used in connection with the system described herein.

Referring to FIG. 8, a diagram 250 illustrates an embodiment of the diskless storage device 224 where each of a plurality of directors 252a-252c are coupled to the memory 226. Each of the directors 252a-252c represents one of the XA's 228a-228c or RA's 232a-232c. In an embodiment disclosed herein, there may be up to sixty four directors coupled to the memory 226. Of course, for other embodiments, there may be a higher or lower maximum number of directors that may be used.

The diagram 250 also shows an optional communication module (CM) 254 that provides an alternative communication path between the directors 252a-252c. Each of the directors 252a-252c may be coupled to the CM 254 so that any one of the directors 252a-252c may send a message and/or data to any other one of the directors 252a-252c without needing to go through the memory 226. The CM 254 may be implemented using conventional MUX/router technology where a sending one of the directors 252a-252c provides an appropriate address to cause a message and/or data to be received by an intended receiving one of the directors 252a-252c. Some or all of the functionality of the CM 254 may be implemented using one or more of the directors 252a-252c so that, for example, the directors 252a-252c may be interconnected directly with the interconnection functionality being provided on each of the directors 252a-252c. In addition, a sending one of the directors 252a-252c may be able to broadcast a message to all of the other directors 252a-252c at the same time.

In some embodiments, one or more of the directors 252a-252c may have multiple processor systems thereon and thus may be able to perform functions for multiple directors. In some embodiments, at least one of the directors 252a-252c having multiple processor systems thereon may simultaneously perform the functions of at least two different types of directors (e.g., an HA and an RA). Furthermore, in some embodiments, at least one of the directors 252a-252c having multiple processor systems thereon may simultaneously perform the functions of at least one type of director and perform other processing with the other processing system. In addition, all or at least part of the global memory 226 may be provided on one or more of the directors 252a-252c and shared with other ones of the directors 252a-252c.

Referring to FIG. 9, a data table 280 is shown as having a plurality of slots 282-284. In an embodiment herein, the data table 280 may be provided in the memory 226 of the diskless storage device 224 and/or in global memory distributed among one or more of the directors 252a-252c of the diskless storage device 224. In some embodiments, the diskless storage device 224 may have a single data table, but, in other embodiments, multiple data tables may be used.

Referring to FIG. 10, the slot 282 is shown in more detail as including a plurality of sectors 292-294. In an embodiment herein, the slot 282 may correspond to eight sectors, a sector may correspond to sixteen blocks and a block may correspond to 512 bytes of data. The size of each of the slots 282-284 may correspond to a size of a track on a disk, even though the diskless storage device 224 does not have any disks. Of course, other data sizes/increments may also be used and, in some cases, it may be possible to have variable slot/sector/block sizes.

Figure 11:
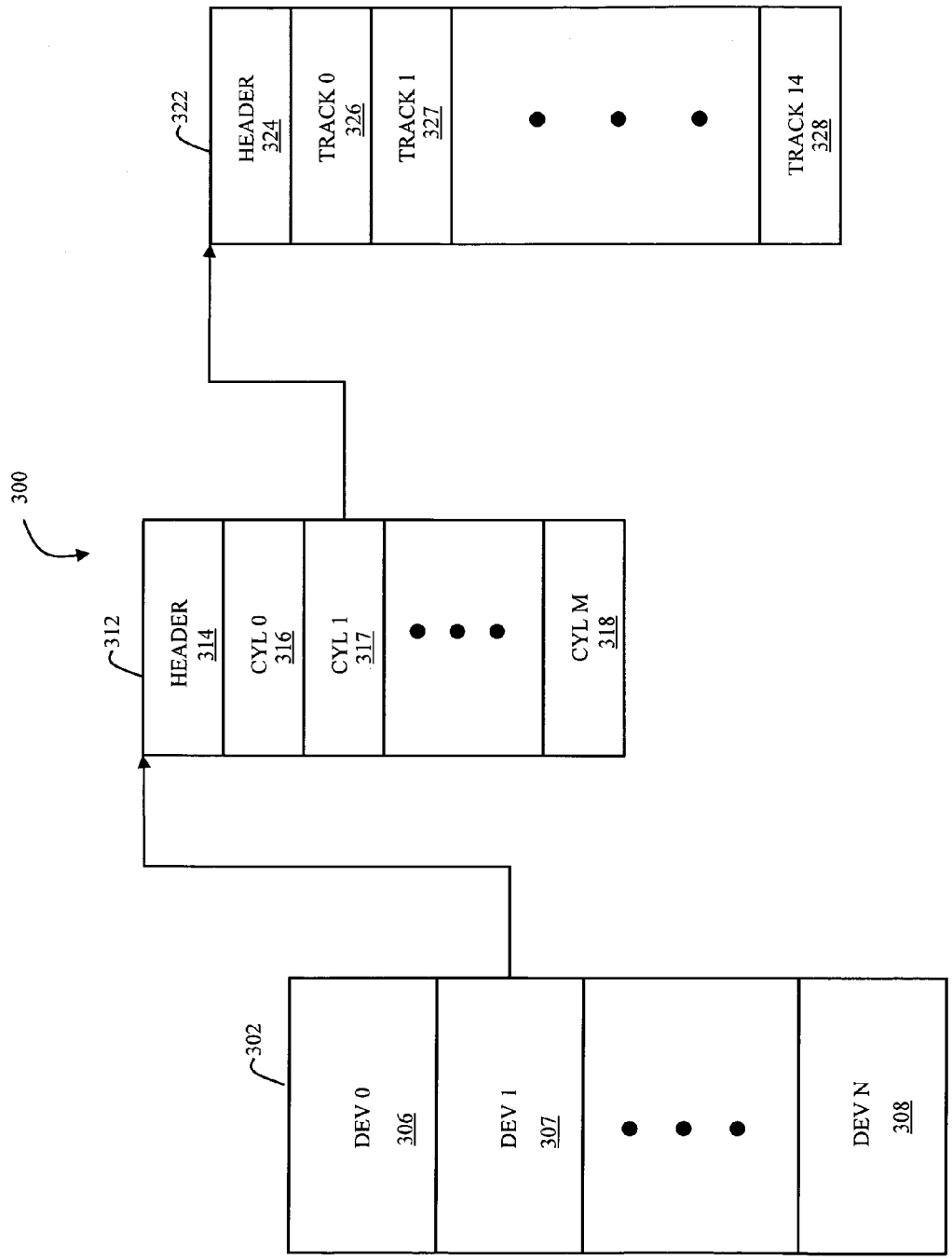
FIG. 11 is a diagram illustrating device tables and data structures used for a diskless storage device according to an embodiment of the system described herein.

Referring to FIG. 11, a diagram 300 illustrates tables that are used to keep track of device information for the diskless storage device 224. A first table 302 corresponds to all logical storage devices that are maintained by the diskless storage device 224 or by an element of the diskless storage device 224, such as an HA and/or an RA. In an embodiment herein, the diskless storage device 224 maintains the logical storage devices which may be presented to one or more external devices (e.g., other RDF sites) coupled to the diskless storage device 224. To the one or more external devices, the diskless storage device 224 may appear to operate identically to a conventional storage device. Thus, the directors 228a-228c of the diskless storage device may provide logical storage device functionality to an external device coupled thereto without using non-volatile memory (e.g., a disk), so that external devices address tracks, blocks, cylinders, etc. of the logical storage devices of the diskless storage device 224.

The table 302 includes a plurality of logical storage device entries 306-308 that correspond to all the logical storage devices used by the diskless storage device 224 (or portion of the diskless storage device 224). The entries in the table 302 may include descriptions for standard logical storage devices and/or other types of logical storage devices.

Each of the entries 306-308 of the table 302 correspond to another table that contains information for each of the logical storage devices. For example, the entry 307 may correspond to a table 312. The table 312 includes a header that contains overhead information. The table 312 also includes entries 316-318 for each of the cylinders of the logical storage device. In an embodiment disclosed herein, a logical storage device may contain any number of cylinders depending upon how the logical storage device is initialized. However, in other embodiments, a logical storage device may contain a fixed number of cylinders.

Each of the cylinder entries 316-318 corresponds to a track table. For example, the entry 317 may correspond to a track table 322 that includes a header 324 having overhead information. The track table 322 also includes entries 326-328 for each of the tracks, where each of the entries 326-328 points to one of the slots 282-284 and possibly includes additional overhead information (e.g., time created, time last modified, etc.). A null pointer in one of the entries 326-328 indicates that there is no corresponding one of the slots 282-284 containing data. In an embodiment disclosed herein, there are fifteen tracks for every cylinder. However, for other embodiments, it may be possible to have different numbers of tracks for each of the cylinders or even a variable number of tracks for each cylinder.

The tables 302, 312, 322 may be stored in the global memory 226 of the diskless storage device 224 (in a location different from the slots 282-284). In addition, the tables 302, 312, 322 corresponding to devices accessed by a particular one of the directors 252a-252c may be stored all or at least partially in memory thereof, that is possibly accessible by other ones of the directors 252a-252c.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time.

In an embodiment herein, the diskless storage device 224 may keep track of the ones of the slots 282-284 that are available for receiving data (i.e., through one or more of the XA's 228a-228c) using any appropriate mechanism, such as maintaining a linked list of free ones of the slots 282-284. In some embodiments, once all of the slots have been used, new data is stored by overwriting an oldest (least recently used) one of the slots 282-284. In other embodiments, the diskless storage device may receive an indication that particular ones of the slots 282-284 no longer need to be maintained and may therefore be designated as free slots available for storing new data.

Diskless storage devices may be used for any number of appropriate purposes, including intermediate RDF sites. In an embodiment herein, data may be received by a diskless storage device used as an intermediate RDF site and stored in one of the slots until the data has been successfully propagated to one or more downstream RDF sites (possibly additional diskless storage devices). After the downstream RDF site(s) have acknowledged safe receipt of the data, the corresponding slot(s) in the diskless storage device may be returned to a list of free slots available for accepting new data. In an embodiment herein, data stored by a diskless storage device in connection with being used as an intermediate RDF site may not be accessed by any hosts coupled to the intermediate RDF site but, instead, may only be propagated to downstream RDF sites.

Figure 12:
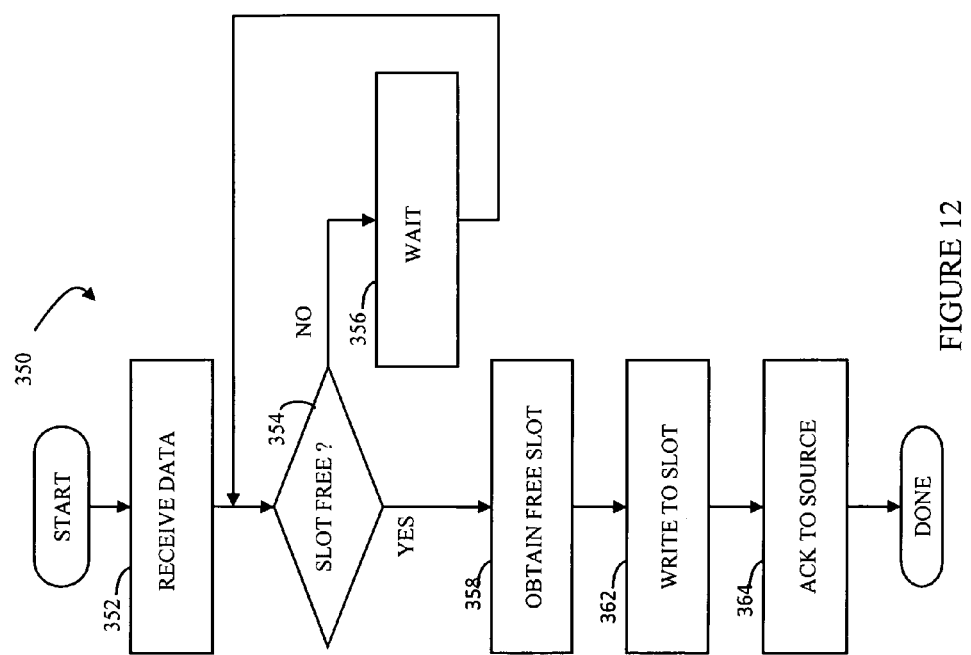
FIG. 12 is a flow chart illustrating steps performed by a diskless storage device acting as an intermediate RDF site and receiving data according to an embodiment of the system described herein.

Referring to FIG. 12, a flow chart 350 illustrates a process for a diskless storage device to receive data in connection with operating as an intermediate RDF site. Processing begins at a first step 352 where RDF data is received by the diskless storage device 224 (e.g., through one of the XA's 228a-228c). Following the step 352 is a test step 354 where it is determined if the diskless storage device has a free slot in which to store the data received at the step 352. If not, then control transfers from the test step 354 to a step 356 where the system waits for a predetermined amount of time (e.g., one second) for a slot to become free. As discussed in more detail elsewhere herein, slots of the diskless storage device 224 are freed when the slots are no longer needed. The diskless storage device 224 may use any appropriate mechanism to indicate which slots are free, including maintaining a linked list of free slots.

Following the step 356, control transfers back to the step 354 to test again if there are any free slots. Note that, in some embodiments, a counter/time may be used to monitor the total number of times and/or amount of time the system needs to wait for a free slot. In some cases, alternative processing (error processing) may be performed if the wait is too long.

If it is determined at the test step 354 that a free slot is available, then control transfers from the test step 354 to a step 358 where the free slot is obtained for use (i.e., locked to prevent use by any other process). Following the step 358, control transfers to a step 362 where the data is written to the slot obtained at the step 358. Following the step 362, control transfers to a step 364 where receipt of the data is acknowledged to the source of the data (e.g., the RDF site that provided the data to the diskless storage device). In some cases, depending on the RDF modes that are used, the diskless storage device 224 may wait to send an acknowledge back to the source until the diskless storage device 224 has successfully transferred data to downstream RDF devices. Following the step 364, processing is complete.

There may be a separate process that examines slots of the diskless storage device and transfers data to downstream RDF sites (other intermediate RDF site(s) and/or remote RDF site (s)). Once the data has been transmitted to, and acknowledged by, all downstream RDF sites, the corresponding slot of the diskless storage device may be freed for future use.

Figure 13:
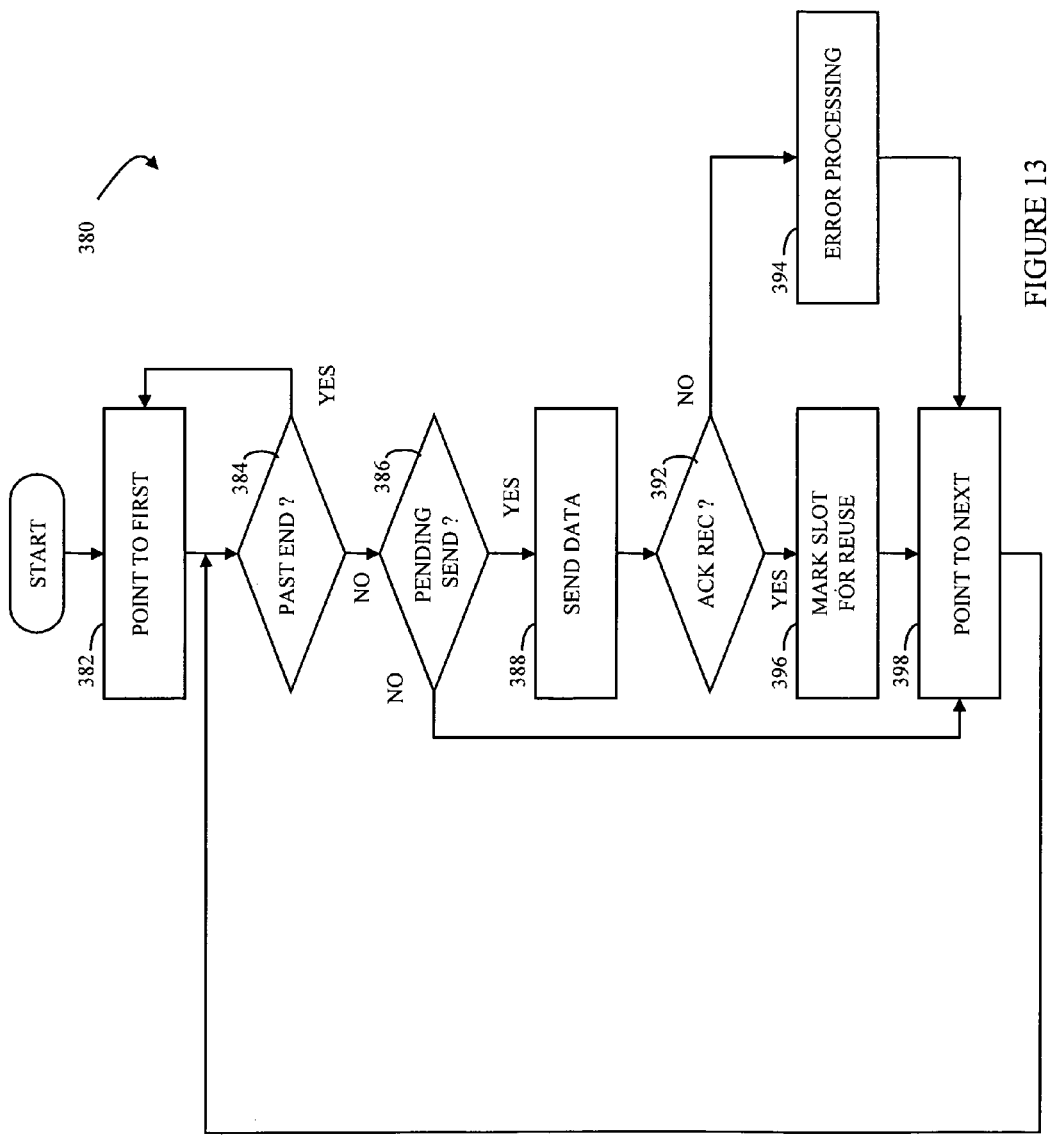
FIG. 13 is a flow chart illustrating steps performed by a diskless storage device acting as an intermediate RDF site and transferring data to downstream RDF site(s) according to an embodiment of the system described herein.

Referring to FIG. 13, a flow chart 380 illustrates processing performed by the diskless storage device 224 to transfer data to one or more downstream RDF sites. Processing begins at a first step 382, where a pointer that iterates through the slots of the diskless storage device is made to point to a first slot. Following the step 382 is a test step 384 where it is determined if the pointer points past the end of the slots (e.g., equals a value that is greater than the highest memory address of the slots). If so, then control transfers from the test step 384 back to the step 382 to reset the pointer. Otherwise, control transfers from the step 384 to a test step 386 where it is determined if the slot pointed to by the pointer has data that needs to be sent to one or more downstream RDF sites.

If it is determined at the test step 386 that the slot pointed to by the pointer contains data that needs to be sent to one or more downstream RDF sites, then control transfers from the test step 386 to a step 388 where the data is sent to the one or more downstream RDF sites using, for example, conventional RDF data transfer mechanisms. Following the step 388 is a test step 392 where it is determined if an appropriate acknowledge signal has been received from the one or more downstream RDF sites. If not, then control transfers from the test step 392 to a step 394 where appropriate error processing is performed (e.g., reporting an error to a user, to a source RDF site, etc.).

If it is determined at the test step 392 that an appropriate acknowledge message has been received from all of the downstream RDF sites, then control passes from the test step 392 to a step 396 where the slot is marked for reuse (returned to a list of free slots for the diskless storage device 224). Following the step 396 is a step 398 where the pointer that iterates through the slots of the diskless storage device 224 is incremented to point to the next slot. Note that the step 398 is also reached following the step 394 and is also reached directly from the test step 386 if the slot pointed to by the pointer does not contain any data that needs to be sent to a downstream RDF site. Following the step 398, control transfers back to the step 384 for another iteration.

Note that, instead of the diskless storage device 224, it is possible to use a thin storage device, where only some of the address space is mapped to physical data. In addition, it is possible to use a storage device having disk space (non-volatile storage), where only the logical storage devices used as intermediate RDF devices are diskless. That is, a conventional storage device may be used, where diskless logical storage devices within the conventional storage device operate as intermediate RDF devices as described herein.

Note that the system described herein provides for data being present on multiple RDF sites. In some cases, a read may be performed at one RDF site while the data (or a more recent version of the data) is present at a downstream RDF site. For example, a cascaded RDF system may have three sites, A, B, and C, where A is a local RDF site, B is an intermediate RDF site, and C is a remote RDF site. Even though A is the local RDF site, there may be instances where B or C contains valid data for a particular subset of the data (e.g., a particular track), such as when faulty storage device(s) at site A have been replaced, but not yet fully synchronized with B and C. In such cases, it would be useful to be able to issue a read request at site A, and have the system obtain the correct data from the appropriate site without the entity that issued the read request (e.g., a host) needing to know which site contains the data. That is, the actual location of the data may be transparent (unknown) to the entity issuing the read request.

Generally, in a system with multiple RDF sites, a read request to one of the RDF sites (current RDF site) may be serviced locally by the current RDF site. If the current RDF site does not contain the most recent version of the data, the current RDF site may pass on the request to downstream RDF sites that are coupled to the current RDF site. One of those RDF sites may service the request with data stored thereon, or may pass on the request to further downstream RDF sites. If none of the RDF sites can service the request, an indication that the read is not serviceable is returned to the requestor.

Figure 14:
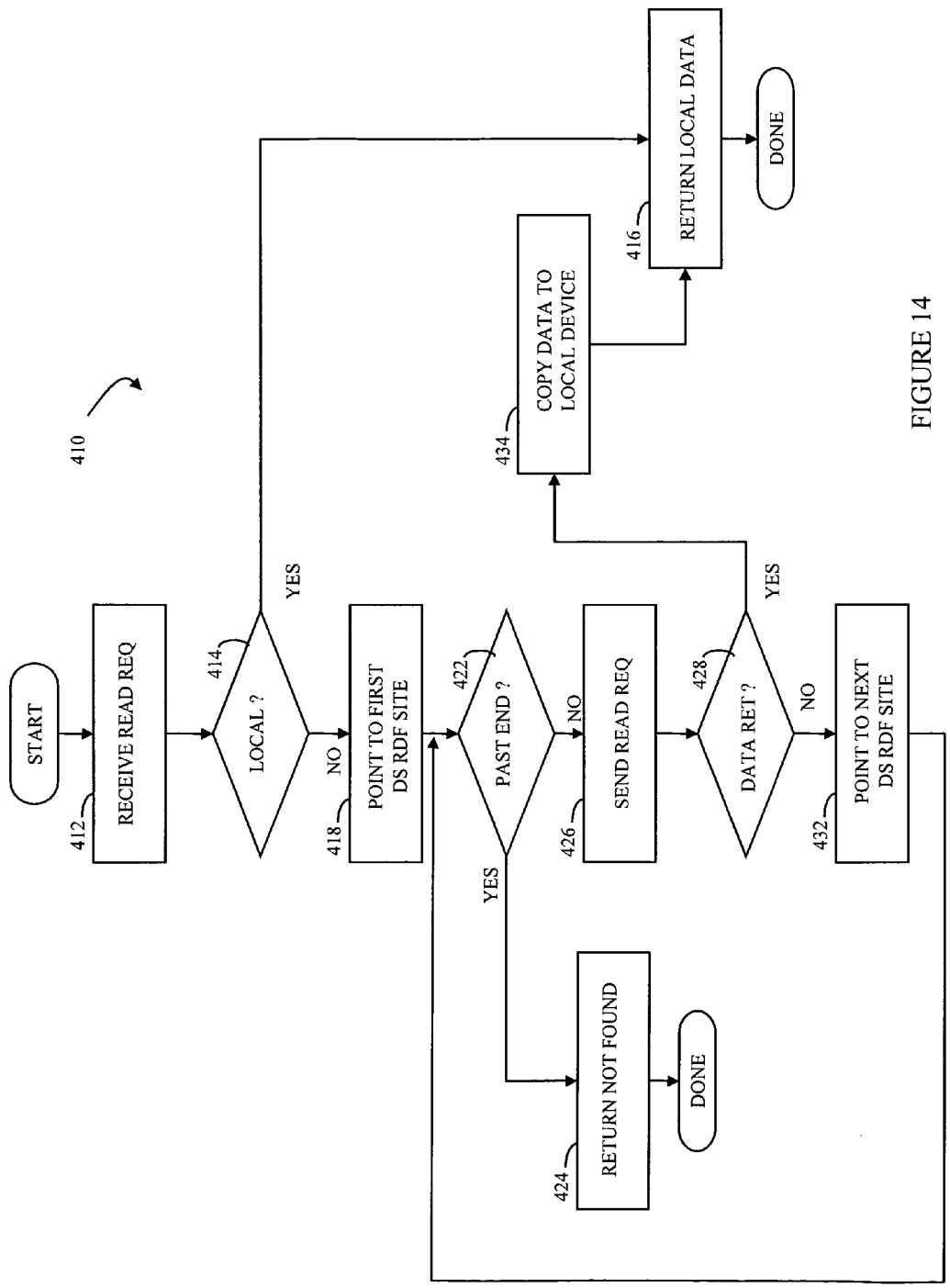
FIG. 14 is a flow chart illustrating steps performed by an RDF site in connection with servicing a read request for a possible remote read operating according to an embodiment of the system described herein.

Referring to FIG. 14, a flow chart 410 illustrates steps performed by a current RDF site in connection with servicing a read request. Note that the read request may be received from any one of a number of sources, including a host, another storage device, another RDF site, etc. Processing begins at a first step 412 where the read request is received. Following the step 412 is a test step 414 where it is determined if the read request can be serviced locally. If so, then control transfers from the step 414 to a step 416 where the read request is serviced locally. Following the step 416, processing is complete.

If it is determined at the test step 414 that the read request cannot be serviced locally, then control transfers from the test step 414 to a step 418 where a pointer, used to iterate through all of the downstream RDF sites coupled to the current RDF site, is set to point to the first site in a list of downstream RDF sites that are coupled to the current RDF site. Following the step 418 is a test step 422 where it is determined if the pointer points past the end of the list, indicating that the system has attempted to read the data from all of the downstream RDF sites coupled to the current RDF site. For example, if a read request had been presented to the RDF site 94 of the diagram 90 of FIG. 5, the pointer would, for each iteration, point to the RDF site 95 and the RDF site 96, after which the pointer would point past the end of a list of the downstream RDF sites 95, 96 coupled to the RDF site 94.

If it is determined at the test step 422 that the pointer points past the end of the list, then control transfers from the test step 422 to a step 424 where an indication that the read cannot be serviced is returned to the calling device. Following the step 424, processing is complete. Otherwise, if it is determined at the test step 422 that the pointer does not point past the end of the list, then control transfers from the test step 422 to a step 426 where the read request is sent to the RDF site indicated by the pointer. Following the step 426 is a test step 428 where it is determined if data has been returned in response to the read request. If not, then control transfers from a test step 428 to a step 432 where the pointer is made to point to the next downstream RDF site coupled to the current RDF site. Following the step 432, control transfers back to the step 422, discussed above, for another iteration.

If it is determined at the test step 428 that data has been returned in response to the read request, then control transfers from the test step 428 to a step 434 where the returned data is copied to the current RDF site. Note that a benefit of the remote read described herein is that the data is copied to various RDF sites so that a subsequent read of the same data may be serviced locally. Following the step 434, control transfers to the step 416, described above, where the read request is serviced locally. Following the step 416, processing is complete.

Figure 15:
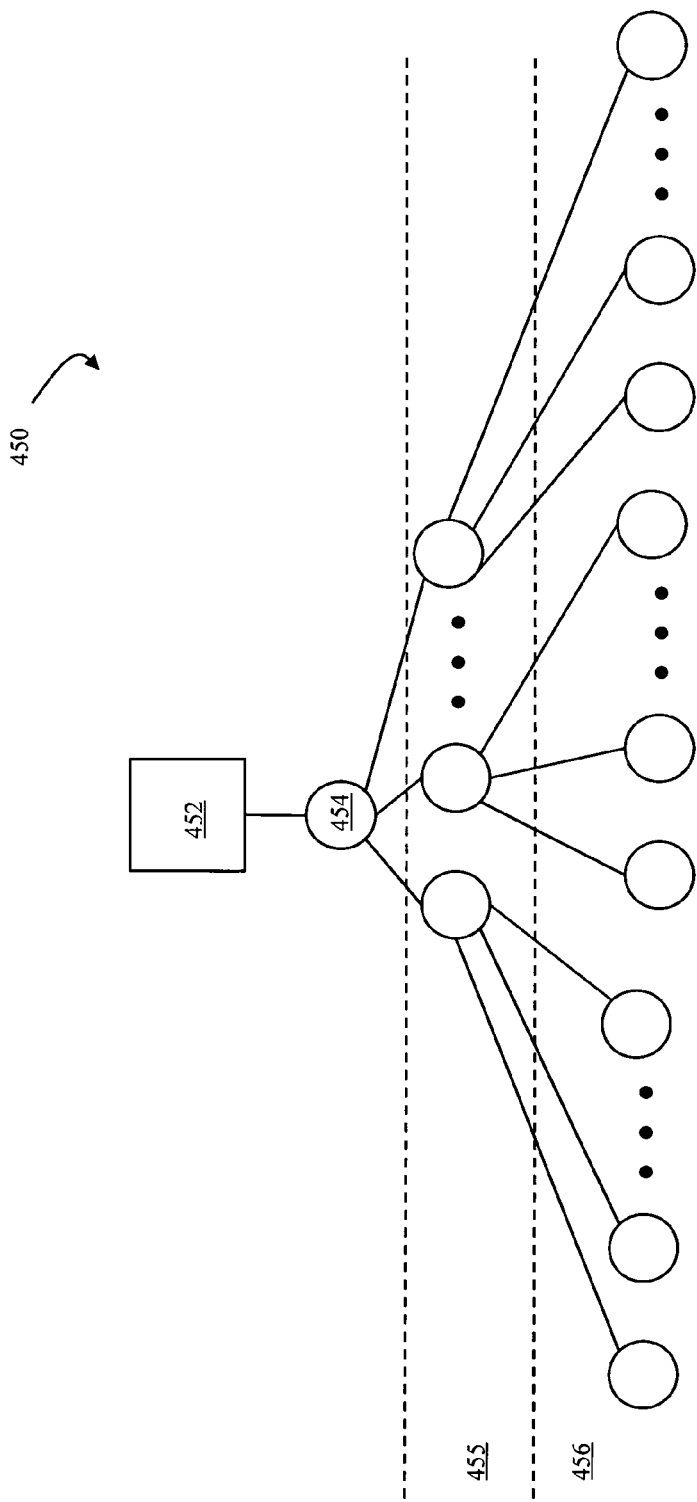
FIG. 15 is a diagram illustrating a configuration of RDF sites that may service a remote read request according to an embodiment of the system described herein.

Referring to FIG. 15, a diagram 450 illustrates a general configuration where a requestor 454 (e.g., a host, another RDF site, etc.) requests data from a current RDF site 456 coupled to the requestor 454. As discussed elsewhere herein, the current RDF site 456 either services the read request locally or propagates the request to downstream RDF sites 457 coupled to the current RDF site 456. The read request is then serviced locally by one of the downstream RDF sites 457 coupled to the current RDF site 456, or may be serviced by one of a group of RDF sites 458 that are coupled to the RDF sites 457, and so on. Thus, the system described herein provides data even in instances where at least one intermediate RDF site is interposed between the current RDF site and the RDF site that contains the data.

According to another embodiment of the system described herein, a cascaded RDF system includes a local RDF site coupled to a source of data, a remote RDF site, and at least one intermediate RDF site, interposed between the local RDF site and the remote RDF site, where data written by the source of data to the local RDF site is propagated through the at least one intermediate RDF site to be stored at the remote RDF site. The source of data may be a host. There may be more than one intermediate RDF site. The cascaded RDF system may also include an additional remote RDF site, coupled to one of the at least one intermediate RDF site. The local RDF site may have a first type of RDF relationship with the at least one intermediate RDF site and the remote RDF site may have a second type of RDF relationship with the at least one intermediate RDF site and where the first type of relationship may be different from the second type of relationship. The first type of RDF relationship may be a synchronous RDF relationship and the second type of RDF relationship may be an asynchronous RDF relationship.

According to another embodiment of the system described herein, an intermediate RDF site includes a memory for storing RDF data received from a first other RDF site and a director that transmits the RDF data to a second other RDF site different from the first other RDF site. The first other RDF site may be a local RDF site. The second other RDF site may be a remote RDF site. The memory may be a volatile memory that includes a plurality of slots. The slots may be marked for reuse in response to data therefor being successfully transmitted to the second other RDF site. The intermediate RDF site may have a first type of RDF relationship with the first other RDF site and a second type of RDF relationship with the second other RDF site, where the first type of RDF relationship may be different from the second type of RDF relationship. The first type of RDF relationship may be a synchronous RDF relationship and the second type of RDF relationship may be an asynchronous RDF relationship.

According to another embodiment of the system described herein, computer software, provided in a computer-readable medium, handles processing for an intermediate RDF site coupled to other RDF sites. The software includes executable code that stores RDF data received from a first other RDF site in a memory of the intermediate RDF site and executable code that transmits the RDF data to a second other RDF site different from the first other RDF site. The first other RDF site may be a local RDF site. The second other RDF site may be a remote RDF site. The memory may be a volatile memory that includes a plurality of slots. The computer software may also include executable code that marks a particular one of the slots for reuse in response to data therefor being successfully transmitted to the second other RDF site. The intermediate RDF site may have a first type of RDF relationship with the first other RDF site and a second type of RDF relationship with the second other RDF site, where the first type of RDF relationship may be different from the second type of RDF relationship. The first type of RDF relationship may be a synchronous RDF relationship and the second type of RDF relationship may be an asynchronous RDF relationship. The computer software may also include executable code that receives an acknowledge indicator from the second other RDF site and, in response thereto, relays the acknowledge indicator back to the first other RDF site.

According to another embodiment of the system described herein, reading data from a storage device includes presenting a read request to the storage device, in response to a more recent version of the data being not being available on the storage device, the storage device requesting the data from an other storage device coupled to the storage device, in response to the more recent version of the data being available at the other storage device, the storage device obtaining and copying the more recent version of the data prior to servicing the read request, and the storage device servicing the read request by providing the data if the data is available. The storage device and the other storage device may be coupled using an RDF protocol. The storage device may be a local RDF site. The other storage device may be a remote RDF site. At least one intermediate RDF site may be interposed between the storage device and the other storage device. In response to the more recent version of the data not being available on the at least one intermediate RDF site, the at least one intermediate RDF site may request the data from at least one downstream RDF site coupled thereto. Reading data from a storage device may also include returning a data not found indicator in response to the more recent version of the data not being available on any of the RDF sites.

According to another embodiment of the system described herein, computer software, provided in a computer-readable storage medium, reads data from a storage device. The software includes executable code that requests the data from an other storage device coupled to the storage device in response to a more recent version of the data being not being available on the storage device, executable code that obtains and copies the more recent version of the data to the storage device prior to servicing the read request in response to the more recent version of the data being available at the other storage device, and executable code that services the read request by providing the data from the storage device if the data is available. The storage device and the other storage device may be coupled using an RDF protocol. The storage device may be a local RDF site. The other storage device may be a remote RDF site. At least one intermediate RDF site may be interposed between the storage device and the other storage device. The computer software may include executable code that causes the at least one intermediate RDF site to request the data from at least one downstream RDF site coupled thereto in response to the more recent version of the data not being available on the at least one intermediate RDF site. The computer software may also include executable code that returns a data not found indicator in response to the more recent version of the data not being available on any of the RDF sites.

According to another embodiment of the system described herein, a data storage device includes a volatile memory and a plurality of directors, coupled to the memory, where at least one of the directors includes computer software; in a computer-readable medium, with executable code that requests the data from an other data storage device coupled to the data storage device in response to a more recent version of the data being not being available on the data storage device, executable code that obtains and copies the more recent version of the data to the data storage device prior to servicing the read request in response to the more recent version of the data being available at the other data storage device, and executable code that services the read request by providing the data from the data storage device if the data is available. The data storage device may also include a non-volatile memory, coupled to at least one of the directors. The non-volatile memory may include disk drives. At least one of the directors may be a disk adaptor coupled to at least one of the disk drives. At least one of the directors may be a remote adaptor that communicates with other storage devices. The remote adaptor may be coupled to the other data storage device.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A diskless storage device, comprising:
a volatile memory; and
at least one director, coupled to the volatile memory, that receives data for the diskless storage device and provides the data to the volatile memory, wherein the at least one director provides logical storage device functionality to store the received data in volatile memory, separate from the diskless storage device, and to transmit the data to at least one other storage device without storing the data in non-volatile memory of the diskless storage device and wherein the logical storage device functionality includes addressing tracks, blocks, and cylinders of logical storage devices of the diskless storage device.

2. A diskless storage device, according to claim 1, wherein the volatile memory includes a plurality of slots and wherein data is stored in the slots.

3. A diskless storage device, according to claim 2, wherein data is stored in at least one of: unused ones of the slots and slots marked for reuse.

4. A diskless storage device, according to claim 3, wherein slots are marked for reuse in response to data therefrom being transmitted by the diskless storage device.

5. A diskless storage device, according to claim 4, wherein data in slots is transmitted to at least one other storage device.

6. A diskless storage device, according to claim 2, wherein, in response to all of the slots being used when new data is written, the diskless storage device waits for a slot to be freed.

7. A diskless storage device, according to claim 6, wherein, following writing data to the volatile memory, an acknowledgement is provided to a source of the data.

8. A non-transitory computer readable medium storing software, the software comprising:
executable code that receives data;
executable code that provides the data to a volatile memory; and
executable code that provides logical storage device functionality to store the received data in volatile memory, separate from the diskless storage device, and transmits the data to at least one other storage device without storing the data in non-volatile memory of the diskless storage device, wherein the logical storage device functionality includes providing functionality for addressing tracks, blocks, and cylinders of logical storage devices.

9. The non-transitory computer readable medium according to claim 8, wherein the volatile memory includes a plurality of slots and wherein data is stored in the slots.

10. The non-transitory computer readable medium according to claim 9, further comprising:
executable code that stores data in at least one of: unused ones of the slots and slots marked for reuse.

11. The non-transitory computer readable medium according to claim 10, further comprising:
executable code that marks for reuse in response to data therefrom being transmitted.

12. The non-transitory computer readable medium according to claim 11, wherein data in slots is transmitted to at least one storage device.

13. The non-transitory computer readable medium according to claim 9, further comprising:
executable code that waits for a slot to be freed in response to all of the slots already being used when new data is written.

14. The non-transitory computer readable medium according to claim 13, further comprising:
executable code that provides an acknowledgement to a source of data following writing the data to the volatile memory.

* * * * *